(12) United States Patent
Lazzouni et al.

(10) Patent No.: US 12,395,330 B2
(45) Date of Patent: Aug. 19, 2025

(54) BIOMETRIC CREDENTIALS REVOCATION OR CANCELLABLE BIOMETRICS

(71) Applicant: AWARE, INC., Bedford, MA (US)

(72) Inventors: Mohamed Lazzouni, Northborough, MA (US); Bob Eckel, Andover, MA (US); Taras Riopka, Concord, MA (US); Jens Peter Hube, Montclair, NJ (US)

(73) Assignee: AWARE, INC., Burlington, MA (US)

( * ) Notice: Subject to any disclaimer, the term of this patent is extended or adjusted under 35 U.S.C. 154(b) by 392 days.

(21) Appl. No.: 17/692,853

(22) Filed: Mar. 11, 2022

(65) Prior Publication Data

US 2022/0294626 A1 Sep. 15, 2022

Related U.S. Application Data

(60) Provisional application No. 63/160,149, filed on Mar. 12, 2021.

(51) Int. Cl.
*H04L 9/08* (2006.01)

(52) U.S. Cl.
CPC .......... *H04L 9/0891* (2013.01); *H04L 9/0869* (2013.01)

(58) Field of Classification Search
CPC ............................ H04L 9/0891; H04L 9/0869
See application file for complete search history.

(56) References Cited

U.S. PATENT DOCUMENTS

| 6,317,834 B1 * | 11/2001 | Gennaro | G07C 9/37 |
| | | | 713/182 |
| 2015/0095654 A1 * | 4/2015 | Li | H04L 9/0866 |
| | | | 713/186 |
| 2019/0166110 A1 * | 5/2019 | Miu | G06Q 20/4014 |
| 2020/0252217 A1 * | 8/2020 | Mathieu | H04L 63/08 |
| 2021/0097166 A1 * | 4/2021 | Arora | H04L 9/0891 |
| 2023/0246839 A1 * | 8/2023 | Mathieu | H04L 9/0866 |
| | | | 713/186 |

OTHER PUBLICATIONS

Pagnin, Elena et al. "Privacy-Preserving Biometric Authentication: Challenges and Directions" Hindawi; vol. 2017; Article ID 7129505; Published Oct. 19, 2017.

* cited by examiner

*Primary Examiner* — Phy Anh T Vu
(74) *Attorney, Agent, or Firm* — Jason H. Vick; Amped IP LLC

(57) ABSTRACT

Methods and systems are provided that allow a user to access a cryptosystem configured to revoke or cancel biometric credentials associated with the user. The cryptosystem may use randomized seeds and projections to identify elements unique to the user and generate a cancellable cryptographic key set used to verify the identity of the user.

20 Claims, 3 Drawing Sheets

BIOMETRIC CREDENTIALS REVOCATION OR CANCELLABLE BIOMETRICS

CROSS REFERENCE TO RELATED APPLICATIONS

The present application claims the benefit of and priority, under 35 U.S.C. § 119(e), to U.S. Provisional Application Ser. No. 63/160,149, filed on Mar. 12, 2021, entitled "BIOMETRIC CREDENTIALS REVOCATION OR CANCELLABLE BIOMETRICS," the entire disclosure of which is hereby incorporated by reference, in its entirety, for all that it teaches and for all purposes.

FIELD

Exemplary aspects are generally directed toward a biometric cryptosystem for capturing, storing, and revoking or canceling biometric information. Aspects may additionally allow a user flexibility in using biometric information for security purposes, while simultaneously allowing the user to revoke or cancel actual or representative biometric templates without the need to store biometric information.

BACKGROUND

Passwords and personal identification numbers (PINs) serve an important purpose for computer security, allowing people to safeguard access to their highly personal information. However, the proliferation of passwords and the difficulty of remembering and maintaining them imposes a major inconvenience on individuals. Technological advancements have made biometrics a potentially convenient and viable alternative to traditional security methods. However, unlike passwords, PINs, and other Personally Identifiable Information (PII) information associated with an individual, biometrics are permanently associated with the individual and cannot be "canceled" or changed if compromised. Various template protection schemes have been developed to overcome the problem of stolen biometrics, since even the highly compressed encodings of biometric templates can be compromised.

For example, deep learning approaches (such as using artificial neural networks) have resulted in major advances in pattern recognition. The capacity of these deep learning approaches to learn from large amounts of data has yielded models that approach human-level performance in many diverse problem domains, including face recognition. However, despite the accuracy of face recognition, the vulnerability of the representations they generate in terms of privacy and security present a great public concern. Various researchers have shown the possibility of face reconstruction using templates generated by deep learning networks, which leads to privacy and security risks. Template protection schemes are critical to safeguarding biometrics, but often suffer from degraded accuracy.

Given the threat of data breaches, loss of identity data, spoof attacks, identity theft, and synthetic identity attacks, there is a growing concern about biometric data being lost or compromised. Once biometric data is compromised, there is no simple way to revoke or cancel the compromised data.

SUMMARY

One exemplary non-limiting aspect is a biometric cryptosystem that combines the accuracy of multiple biometrics with the security of a transient, cancelable template. The cryptosystem may be configured to extract the most stable information from one or more biometrics from an individual, and to use the stability information to generate a revocable, public template that can be used to verify that individual without having to store their biometric information. The system has several exemplary, non-limiting advantages associated therewith. For instance, no biometric template data need ever be stored on an individual's device. Further, the combination of multiple biometrics enables increased accuracy to compensate for potential accuracy degradation of using a single biometric as well as the increased security associated with the use of multiple biometrics. In at least one embodiment, the combination of multiple biometrics may increase the accuracy and security without compromising system performance. For example, the biometric template (which may comprise multiple biometric modalities) may be implemented in the system similarly to or the same as a single biometric, which affords the system greater security without reducing the performance thereof.

The embodiments of the present disclosure beneficially enable users to (1) manipulate or cancel biometric data that, with conventional systems, would not be cancelable or revocable, (2) construct secure credentials for accessing sensitive material with reduced risk of

DETAILED DESCRIPTION

Exemplary aspects of the present disclosure will be described in connection to revocable or cancellable biometrics. Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practice or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
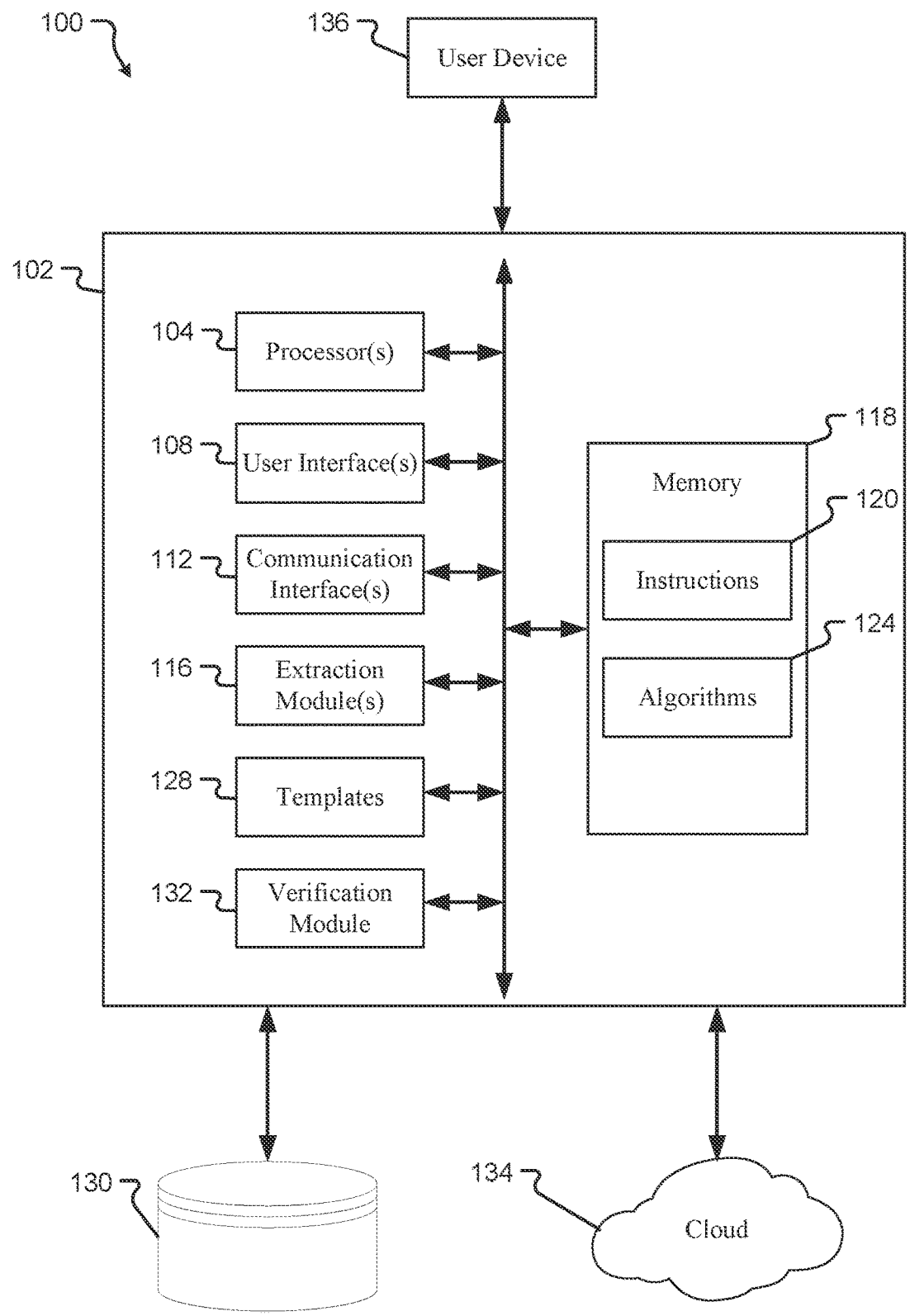
FIG. 1 shows a block diagram of a system in accordance with aspects of the present disclosure.
Figure 2:
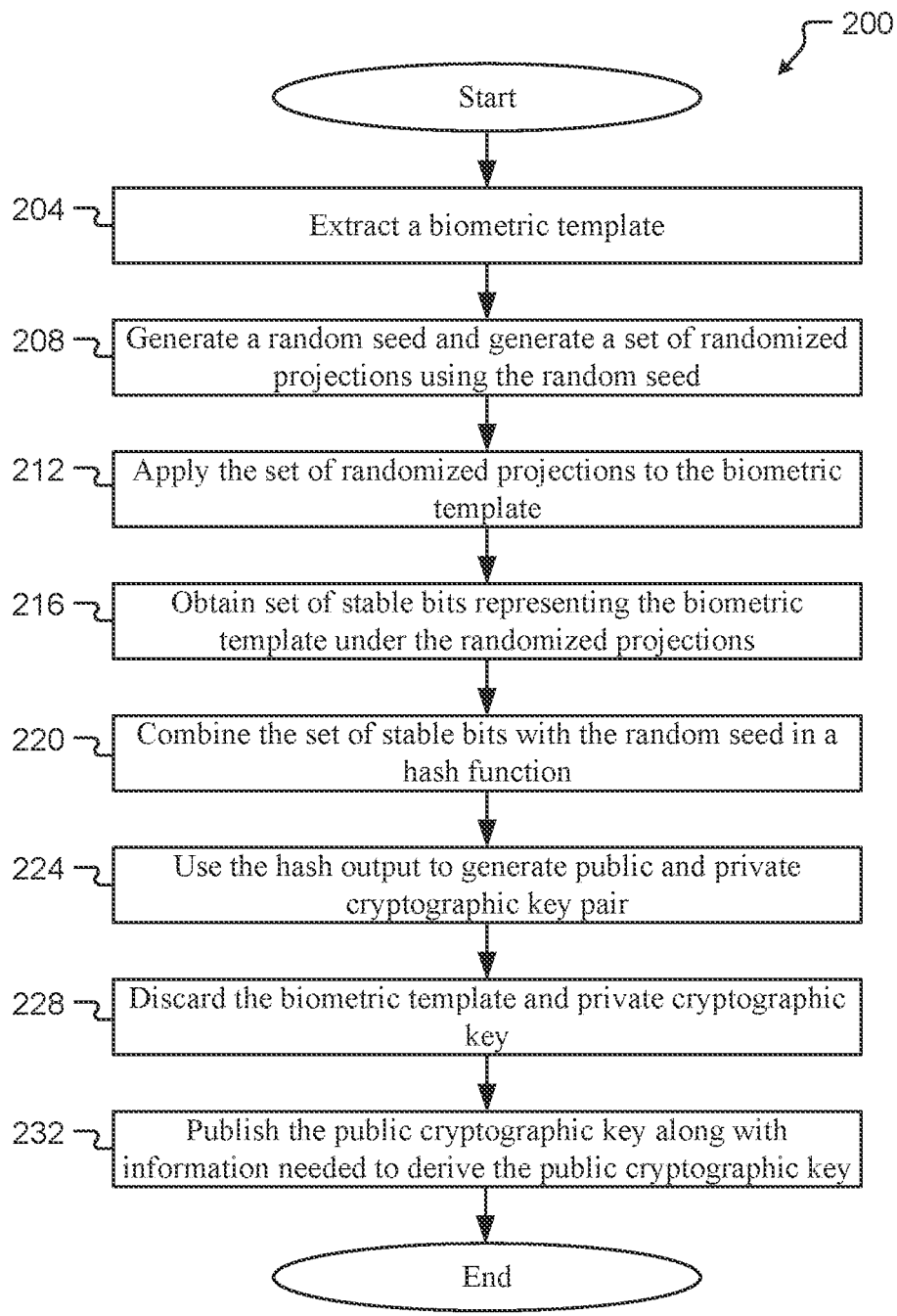
FIG. 2 illustrates a flow diagram illustrating example operations in accordance with aspects of the present disclosure.

FIG. 1 illustrates a system 100 in accordance with at least one embodiment of the present disclosure is shown. The system 100 as described herein permits a user to create and store biometric modalities for use in, for example, identification of the user; to communicate (e.g., send and receive) information with other devices; to revoke or otherwise cancel the stored biometric modalities, and the like.

The system 100 comprises a controller 102, a database(s) 130, and/or a cloud or other network or networked storage 134. Systems according to other embodiments of the present disclosure may comprise more or fewer components than the system 100. For example, the system 100 may not include the database 130. In some embodiments, the database 130 may be located within the controller 102.

The controller 102 comprises at least one processor 104, at least one user interface 108, at least one communication interface 112, at least one extraction module 116, at least one memory 118, instructions 120, one or more algorithms 124, one or more templates 128, at least one verification module 132, and a random seed generator 140. Computing devices according to other embodiments of the present disclosure may comprise more or fewer components than the controller 102.

The processor 104 of the controller 102 may be any processor/controller described herein or any similar processor. The processor 104 may be configured to execute instructions stored in the memory 118, which instructions may cause the processor 104 to carry out one or more computing steps utilizing or based on data received from the database 130 and/or the cloud or other network 134.

The memory 118 may be or comprise RAM, DRAM, SDRAM, other solid-state memory, any memory described herein, or any other tangible, non-transitory computer-readable medium or memory for storing computer-readable data and/or instructions. In some embodiments, the memory 118 may be a virtual memory (e.g., a cloud computing network, cloud storage, etc.) embodied in multiple servers or other memory devices across multiple locations. In some embodiments, the memory 118 may be or comprise a non-transitory, computer-readable medium. The memory 118 may store information or data useful for completing, for example, any step of the methods 200 and/or 300 described herein, or of any other methods. The memory 118 may store, for example, instructions 120 and/or one or more algorithms 124. Such instructions or algorithms may, in some embodiments, be organized into one or more applications, modules, packages, layers, or engines. The algorithms and/or instructions may cause the processor 104 to manipulate data stored in the memory 118 and/or received from or via the database 130 and/or the cloud or other network 134.

The controller 102 may also comprise one or more user interfaces 108. The user interface 108 may be or comprise a keyboard, mouse, trackball, monitor, television, speaker, camera, laser, ultrasound or IR transmitters or receivers, radio wave emission/detection devices (e.g., Radio Detection and Ranging (RADAR) devices, Doppler RADAR devices, etc.), LED, screen, touchscreen, and/or any other device for receiving information from a user and/or for providing information to a user. The user interface 108 may be used, for example, to receive a user selection or other user input regarding any step of any method described herein. Notwithstanding the foregoing, any required input for any step of any method described herein may be generated automatically by the system 100 (e.g., by the processor 104 or another component of the system 100) or received by the system 100 from a source external to the system 100. In some embodiments, the user interface 108 may be useful to allow a user to modify instructions to be executed by the processor 104 according to one or more embodiments of the present disclosure, and/or to modify or adjust a setting of other information displayed on the user interface 108 or corresponding thereto.

Although the user interface 108 is shown as part of the controller 102, in some embodiments, the controller 102 may utilize a user interface 108 that is housed separately from one or more remaining components of the controller 102. In some embodiments, the user interface 108 may be located proximate one or more other components of the controller 102, while in other embodiments, the user interface 108 may be located remotely from one or more other components of the controller 102 or of the other components of the system 100 (e.g., the database 130, the cloud or other network 134, the user device 136, etc.).

The controller 102 may also comprise a communication interface 112. The communication interface 112 may be used for receiving image data or other information from an external source(s) (the database 130, the cloud or other network 134, and/or any other system or component not part of the system 100), and/or for transmitting instructions or other information to an external system or device (e.g., another controller 102, the database 130, the cloud or other network 134, and/or any other system or component not part of the system 100). The communication interface 112 may comprise one or more wired interfaces (e.g., a USB port, an ethernet port, a Firewire port, coaxial cable, fiber-optic cable, and/or combinations thereof) and/or one or more wireless transceivers or interfaces (configured, for example, to transmit and/or receive information via one or more wireless communication protocols such as 802.11a/b/g/n/ac, Bluetooth®, NFC, ZigBee®, communication over a cloud network, 4G, 5G, antennas for transmitting/receiving wireless signals, lasers, microwaves, combinations thereof, and so forth). In some embodiments, the communication interface 112 may be useful for enabling the controller 102 to communicate with one or more other processors 104 or controllers 102, whether to reduce the time needed to accomplish a computing-intensive task or for any other reason.

The controller 102 may also comprise an extractor 116. The extractor 116 may be configured to extract biometric information associated with a user. For instance, the user may wish to store or provide one or more biometric modalities (e.g., fingerprints, iris scans, handprint scans, face scans, etc.) for future use. In some embodiments, the extractor 116 may further access features or instructions in a user device to capture the biometric information. Examples of devices in or used by the extractor 116 include, but are not limited to, a fingerprint scanner, an iris scanner, a camera, a microphone, combinations thereof, and/or any other internal or external capture method coupled with the user device to capture the biometric information. In some embodiments, the extractor 116 be manipulated by a processor (e.g., a processor 104) to carry out the extraction of one or more biometric modalities in accordance with embodiments of the present disclosure.

The controller 102 may also comprise one or more templates 128. The template 128 may be or comprise recorded biometric information (e.g., fingerprint scans, facial scans, iris scans, pulse rate measurements, palm scans, voice scans, blood pressure measurements, hand vein pattern scans, ear scans, signature scans, etc.), biographical information (e.g., a password, a user PIN, a street address, a birth date, a phone number, a business name, etc.), behavioral data, metadata associated with the biometric information and/or biographical information, and/or any combinations thereof. In some embodiments, the template 128 may be a combination of one or more types of biometric information (e.g., a combination of data from a fingerprint scan, a face scan, and/or an iris scan). For example, the controller 102 may take data associated with the fingerprint scan, the face scan, and/or the iris scan (e.g., pixel color values, metadata, etc.) and store each data set in one or more matrices. The data may then be further combined (e.g., the matrices may be added, subtracted, multiplied, etc.) into a single matrix that contains data related to the fingerprint scan, the face scan, and/or the iris scan.

The controller 102 may also comprise a verifier 132. The verifier 132 may include a filter and be configured to pre-filter any extracted information (e.g., biometric information extracted by the extractor 116) to determine the authenticity of the captured information. For instance, the verifier 132 may utilize pre-face filtering techniques to determine whether captured face scans truly depict a face of the user. In instances where the captured scan is not of a user's face (e.g., the user was wearing a mask when the scan was performed), the verifier 132 may omit the storage and/or use of the captured scan or portions thereof. In another example, the verifier 132 may be or configured to connect to a scanner that is capable of detecting silicon fingerprinting, such that the verifier 132 may be able to determine when a user is attempting to enter fingerprints of an individual who is not the user. In still another example, the verifier 132 may be capable of detecting an iris scan of an individual, and determine if the iris scan matches the individual, and/or whether the captured scan depicts a human iris (as compared to, for example, a scan of an animal iris). In some embodiments, the verifier 132 may comprise a quality module which may be capable of determining a quality associated with the captured biometric information. In such embodiments, the quality module may be instructions stored in a memory that, when executed by a processor, cause the processor to operate, for example, a machine learning or artificial intelligence algorithm that may detect poor quality in the biometric information. The detection systems of the verifier 132 or accessed by the verifier 132 are not particularly limiting and may comprise additional and/or alternative detection devices and techniques, and/or combinations thereof.

The system 100 may comprise a user device 136. The user device 136 may be used by a user to, among other things, capture biometric information associated with the user. For example, the user device 136 may comprise a camera configured to capture a facial scan of the user's face. The user device 136 may be a phone, a mobile device (e.g., a smartphone), computer, laptop, tablet, wearable device, intelligent machine, a biometric capturing/acquisition device, laser, and the like. In some embodiments, the user device 136 may comprise one or more components of the system 100 (e.g., the controller 102 and/or one or more components thereof, the database 130) and may be configured to connected to one or more devices or systems outside the system 100 (e.g., another user device) via, for example, the cloud or other network 134.

The method 200 (and/or one or more steps thereof) may be carried out or otherwise performed, for example, by at least one processor. The at least one processor may be the same as or similar to the one or more processors 104 of the system 100 described above. The at least one processor may be part of a user device (such as a processor 104) or part of a system external to the user device (such as an external controller 102). A processor other than any processor described herein may also be used to execute the method 200. The at least on processor may perform the method 200 by executing instructions stored in a memory such as the memory 118. The instructions may correspond to one or more steps of the method 200 described below. The instructions may cause the processor to execute one or more algorithms, such as one or more algorithms 124.

The method 200 comprises extracting a biometric template (step 204). The biometric template may contain information directed to one or more biometric modalities (e.g., fingerprint data, facial scan data, etc.) and may additionally or alternatively contain information associated with one or more non-biometric modalities (e.g., a PIN number, a password, other Personally Identifiable Information (PII), or anything else deemed valuable or vulnerable to the user, etc.). The biometric template may be extracted from the user (using, for example, an extractor 116, a verifier 132, combinations thereof, and/or the like). In some embodiments, the biometric templates may be fusions (e.g., combinations) of biometric and/or non-biometric information.

For example, a user may capture both a voice scan and a facial scan, which may be combined into a single template. In some embodiments, the combination of biometric information may be layered or otherwise combined such that neither the voice scan data nor the facial scan data is easily separable from one another. For instance, the captured biometric information of the voice scan and the facial scan may be passed through one or more algorithms (e.g., an algorithm 124) to integrate the biometric information into a single template, such as by generating linear combinations of the voice data and the facial data with known weights. The algorithm may be a deep learning net (e.g., convolutional neural network (CNN), deep neural network (DNN), other neural networks, combinations thereof, and/or the like) that is trained on data similar to the captured biometric information (e.g., a neural network trained on voice scans and facial scans) that receives the biometric information and outputs an integrated template containing the biometric information associated with both the voice scan and the facial scan. As previously noted, in some embodiments fusion of the biometric information may be such that extraction of individual biometric information (e.g., information associated with only the fingerprint scan or only the facial scan) from the combination may be difficult or impossible. Some non-limiting examples of possible combinations include a logical combination, a mathematical combination (e.g., additive, multiplicative, etc.), an image/graphical combination, a pictorial combination, a partial combination, a multilayer combination, a random combination, a filtered combination, a nonlinear combination, and/or combinations thereof. The combination of the templates is in no way limiting, and any technique capable of combining data may be used. Moreover, any number of templates may be combined using any data combination technique in any order. A non-limiting example may be to form the digital information associated with a modality into a matrix, which is then broken into parts and reassembled with other parts of other modalities to form a new matrix that is a combination of portions of matrices associated with the other modalities. Another non-limiting example may involve utilizing a mathematical projection into a feature space. For example, the mathematical projection may project a matrix containing biometric information from one or more of the modalities into one or more spaces (e.g., an orthogonal projection in Euclidean space). The mathematical projections may be carried out by one or more algorithms configured to perform mathematical projections of one or more tensors (e.g., vectors, matrices, etc.) from a first vector space to a second vector space. In some embodiments, the combination method may be independent of the modalities selected by the user. In other words, the modalities may be combined in any manner to form the fusion template. In some embodiments, the fusion template may be compressed (e.g., using a data compression algorithm) while still providing an increased level of security than a single biometric modality. For example, while the fusion template may be compressed, the compressed data may still comprise information about multiple biometric modalities, affording the fusion template greater security than using a single biometric modality. In some embodiments, the biometric template may be omitted from being stored (e.g., the information associated with the extracted biometric information will not be stored in a database).

The method 200 also comprises generating a random seed and generating a set of randomized projections using the random seed (step 208). In some embodiments, the random seed may be randomly generated using one or more algorithms or machine learning/artificial intelligence models that generate a string of numbers randomly or pseudorandomly, and may be a sequence of random numbers or alphanumerics. The random seed may be used by the system 100 and/or one or more components thereof (e.g., a controller 102) to generate a set of randomized projections. For example, the random seed may be passed into an algorithm (e.g., one or more algorithms 124) which may randomly populate an object (e.g., a matrix) with random values based on the random seed. In some embodiments, the set or collection of randomized projections may comprise a plurality of matrices, with each matrix comprising random values generated using the random seed. In some embodiments, the random seed may be provided or entered by a user (e.g., via a user interface, via an extraction module, etc.).

The method 200 also comprises applying the set of randomized projections to the biometric template (step 212). In at least one embodiment, the biometric template may be a matrix of values and the collection of randomized projections may also be matrices containing the random values generated based on the random seed. The randomized projections matrices may be applied to the biometric template matrix, such as by matrix multiplication, to project or otherwise mathematically map the biometric template matrix values into a different mathematical dimension, resulting in projected data. For example, if the projection matrix A is dimension n by dimension m in size and the biometric template matrix B is dimension m by dimension k in size, then AB (projection matrix A multiplied with biometric template matrix B) would be dimension n by dimension k. In some embodiments, the biometric template may be or comprise a vector, matrix, or tensor of a first mathematical dimension (say, dimension k), and the biometric template may then be projected based on the multiplication of the randomized projection matrices into a second mathematical dimension (say, dimension m). In some embodiments, the first mathematical dimension may be significantly higher than the second mathematical dimension (e.g., k»m).

As used herein and unless otherwise specified, the term "significantly higher" (or similarly "significantly lower" depending on the comparison) may mean that the value of the first mathematical dimension is larger (or smaller) than the value of the second mathematical dimension such that a set of mathematical objects (e.g., vectors, matrices, other tensors, etc.) can be linearly mapped from the first mathematical dimension to the second mathematical dimension such that the distance between the vector components is preserved in accordance with the Johnson-Lindenstrauss lemma. The Johnson-Lindenstrauss lemma states that if points in a vector space are of sufficiently high dimension, the points may be projected into a lower-dimensional space in a way which approximately preserves the distances between the points. In some embodiments, the random projection matrices may be generated using Gaussian random projection, sparse random projections, and the like. In some embodiments, the generation of the random projections may be improved computationally (e.g., generated in less time) by varying the spherical symmetry, the orthogonality, and/or the normality of the matrices.

In some embodiments, the randomized projections may be separately and individually applied to the biometric template to generate the projected data. For example, if the randomized projections comprise three individual matrices A, B, and C, the step 212 and/or one or more aspects thereof may apply the randomized projections to the biometric template matrix D (e.g., determine AD, BD, and CD). In some embodiments, the random seed, the randomized projection matrices, and/or the results of the application of the randomized projections to the biometric template may be stored or saved (e.g., in a database 130). While the example here used three matrices, additional or alternative matrices may be used, and the present disclosure is in no way limited in number and type of matrices used to project the biometric template matrix from a first mathematical dimension to a second mathematical dimension.

The method 200 also comprises obtaining a set of stable bits representing the biometric template under the randomized projections (step 216). In some embodiments, the values of the biometric template matrix may range between a maximum value (e.g., 1) and some minimum value (e.g., −1). In some embodiments, the biometric template matrix values may initially have a wider range of values, but are normalized to range from anywhere between (and including) a maximum value of one and a minimum value of negative one.

In some embodiments, identifying the set of stable bits may be based on a comparison between the biometric template and another biometric template (say, a biometric template generated based on biometric information retrieved from a different user). The comparison may be evaluated based on a mathematical difference (e.g., a Euclidean distance) between the two biometric templates. Accordingly, any values in the biometric template generated for the user may remain the same or similar to previous generations or creations of the same biometric template. In some embodiments, the method 200 may filter out any biometric templates that fall outside a percent difference from an original biometric template.

Further, the values of the biometric template matrix that are close to zero will remain close to zero but may change mathematical sign (e.g., positive to negative or vice versa) when projected into a different mathematical dimension, while the values further away from zero will remain further away from zero and are unlikely to mathematical change sign (e.g., 0.99 is unlikely to change to a negative number when projected using the randomized projection matrices into a different mathematical dimension) when the biometric template is recaptured, such as when the user generates a similar biometric template in the future. As such, values that do not change sign when the biometric template undergoes transformations may be considered to be stable.

In some embodiments, the method 200 and/or one or more aspects thereof may set a threshold. For example, a threshold value of 0.7 based on normalized minimum and maximum values of −1 and 1, respectively may be selected, with the values in the transformed biometric template matrix whose absolute values meet or exceed the threshold being deemed stable values and assigned a positive or negative value. For example, a value of 0.002 may, when the biometric template is recaptured in the future, flip mathematical signs to −0.002. Since the value of 0.002 does not meet the threshold, it is not considered to be a stable value. However, a value of 0.99 is unlikely to change mathematical sign, and exceeds the threshold of 0.7, so the value of 0.99 may be assigned as a positive value. In at least one embodiment, the positive value may be denoted with a zero, while a negative value whose absolute value exceeds the threshold (e.g., −0.85) may be donated with a 1. In some embodiments, a set of stable bits for each randomized projection applied to the biometric template matrix may be collected. For example, data associated with the location of the stable bit (e.g., a location within a matrix or other mathematical object) and the value associated with the stable bit (e.g., 0 for positive, 1 for negative) for each of the collection of randomized projections may be saved in a database (e.g., a database 130).

In some embodiments, the method 200 and/or one or more aspects thereof may fix the number of random projections used on the biometric template. For example, only a predetermined number of random projections may be applied to the biometric template. This may be done to, for example, ensure a constant processing time (e.g., time required to apply all random projections to the biometric template). In such embodiments, the security level (e.g., the robustness of the identification of the set of stable bits) may be based on the identity of the user (e.g., some biometric templates generate a unique or different number of stable bits for a given number of random projections to a specific biometric template). In other embodiments, the security level may be fixed. In other words, a certain number of stable bits may be required to verify the biometric template, which may alter the amount of processing time. For example, for each projection matrix applied to the biometric template matrix, the number of stable bits tracked and compared with a threshold value. If the number of bits exceeds the threshold value (e.g., the threshold requires at least 50 bits to be considered stable, and the random projection applied to the biometric template matrix results in 64 stable bits), then the locations and values associated with each stable bit may be saved. If the number of bits does not exceed the threshold value, then the data may not be stored. In some embodiments, the processing time may vary based on how many projections are required to obtain the required number of stable bits.

The method 200 also comprises combining the set of stable bits with the random seed in a hash function (step 220). The hash function may be any function or algorithm (e.g., one or more algorithms 124) configured to map data of a first size to a fixed-size value. For example, the hash function may take the random seed, indices associated with the stable bits, and/or the values associated with the stable bits as an input and may output a numeric or alphanumeric. In some embodiments, the hash function may be a cryptographic hash function (e.g., a Secure Hash Algorithm 1) that may map data to a bit array of a fixed size.

The method 200 also comprises using the hash output to generate a public and private cryptographic key pair (step 224). The public cryptographic key and the private cryptographic key may be cryptographically generated (e.g., using a key generation program or algorithm) and may be used, for example, to verify the biometric template during future use. For instance, the public cryptographic key may be used to encrypt the user's biometric information when the biometric information is used, for example, to verify individual identity.

The method 200 also comprises discarding the biometric template and the private cryptographic key (step 228). The biometric template and the private cryptographic key, for example, may be omitted from being stored (e.g., in a database such as a database 130), deleted, overwritten, discarded, or otherwise expunged. This may ensure that no biometric information is saved by a system, allowing a user identity to be used for verification only in instances where the user can provide the correct biometric information (e.g., through a face scan and a voice scan).

The method 200 also comprises publishing the public cryptographic key along with information needed to derive the public key (step 232). The information needed to derive the public key may comprise the random seed (and/or the method for generating the random seed) and information related to or associated with the set of stable bits (e.g., the location and value information associated with each of the stable bits). In some embodiments, the public cryptographic key and the information may be shared (e.g., over a network such as a cloud or other network 134) or stored (e.g., in a database such as a database 130) to allow the user to use his biometric information to, for example, verify his identity.

Figure 3:
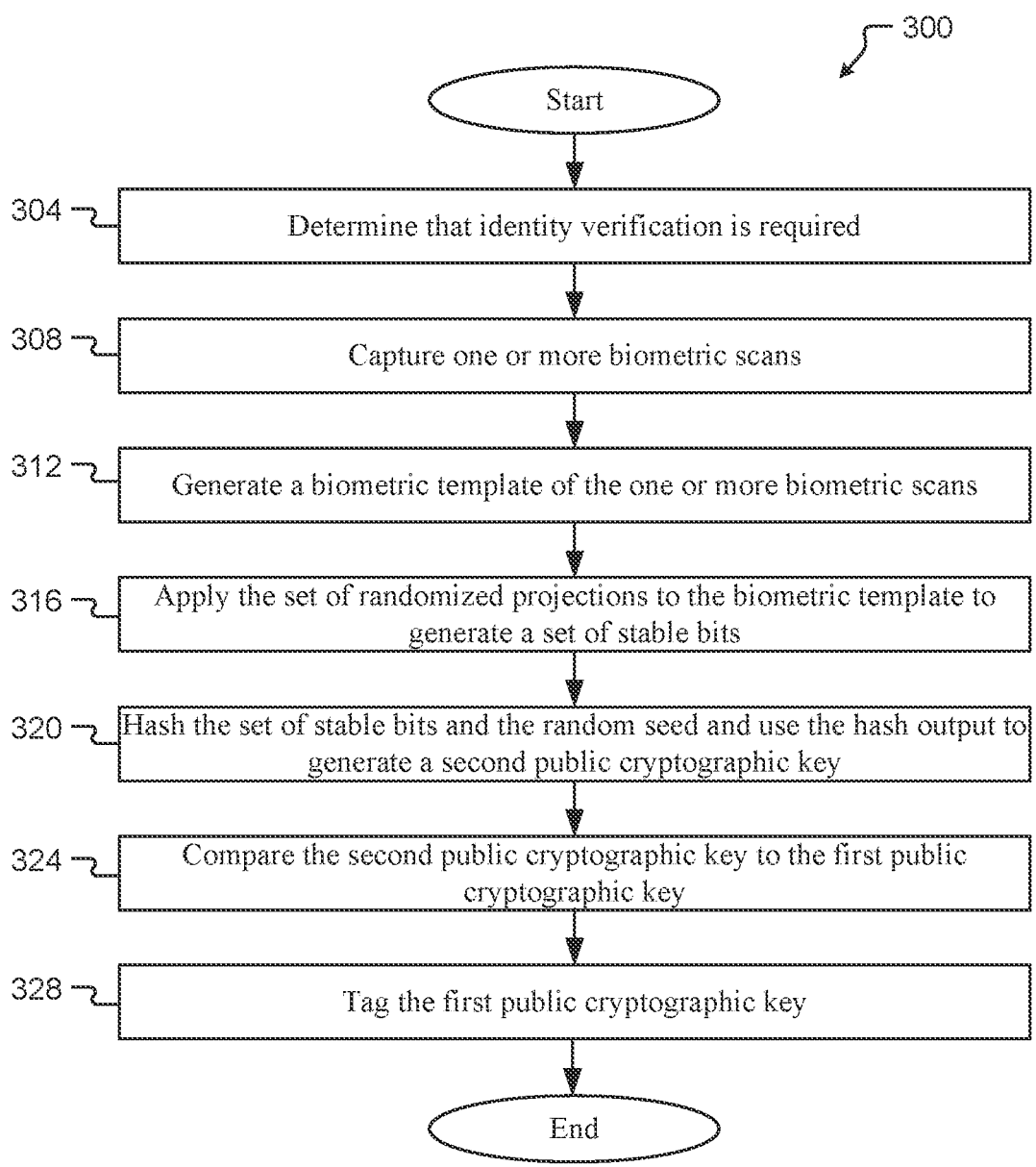
FIG. 3 illustrates a flow diagram illustrating example operations in accordance with aspects of the present disclosure.

In at least one embodiment, the method 200 and/or one or more aspects thereof may permit the user to use the biometric information to verify his identity and revoke or cancel any biometrics the user wishes, as discussed with reference to FIG. 3 and a method 300.

The method 300 (and/or one or more steps thereof) may be carried out or otherwise performed, for example, by at least one processor. The at least one processor may be the same as or similar to the one or more processors 104 of the system 100 described above. The at least one processor may be part of a user device (such as a processor 104) or part of a system external to the user device (such as an external controller 102). A processor other than any processor described herein may also be used to execute the method 300. The at least on processor may perform the method 300 by executing instructions stored in a memory such as the memory 118. The instructions may correspond to one or more steps of the method 300 described below. The instructions may cause the processor to execute one or more algorithms, such as one or more algorithms 124.

The method 300 comprises determining that identity verification is required (step 304). For example, the user may be attempting to access his bank account and may be required to verify his identity. A controller may identify this based on, for example, a user input to a user device 136.

The method 300 also comprises capturing one or more biometric scans (step 308). The user may capture one or more biometric scans that can be used to verify his identity. For instance, the user may capture a facial scan and a voice scan. In some embodiments, the facial scan and/or the voice scan may be captured using the user device 136, and may be verified by a verification module 132. In some embodiments, the type of biometrics required may be correlated with the type of activity the user undertakes. For instance, accessing a bank account may require a greater amount of biometric information than for changing a password on the user device 136.

The method 300 also comprises generating a biometric template of the one or more biometric scans (step 312). The user may use the controller to combine the facial scan and the voice scan into a biometric template. In some embodiments, the template may be formed based on a processor 104 processing instructions 124 that cause the processor 104 to generate the biometric template. In some embodiments, the biometric template may be generated based on a saved template, such that the controller 102 automatically combines the captured facial scan and voice scan according to saved instructions.

The method 300 also comprises applying the randomized projections to the biometric template to generate a set of stable bits (step 316). In some embodiments, the application of the randomized projections to the biometric template to generate the set of stable bits may be similar to or the same as the steps 212 and 216 of the method 200. In some embodiments, the set of stable bits and the set of randomized projections may be saved to, for example, a database 130.

The method 300 also comprises hashing the set of stable bits and the random seed and using the hash output to generate a second public cryptographic key (step 320). The second public cryptographic key may be part of a public/private cryptographic key pair generated using one or more algorithms (e.g., using a key generation program or algorithm). In some embodiments, the hashing and generation of the cryptographic key pair may be similar to or the same as the steps 220 and 224 of the method 200. In some embodiments, the second public cryptographic key may be saved, while the complementary second private cryptographic key may be discarded after generation.

The method 300 also comprises comparing the first cryptographic public key to first cryptographic public key (step 324). Returning to the bank example, the user will regenerate the same public key as the first public cryptographic key, since it was the user's original biometric scans (and corresponding biometric template) that was used to generate the first cryptographic public key. As a result, the bank system may verify the user. The verification may include generating a confirmation code that can be used by the bank system to permit the user entry into one or more bank systems (e.g., permit the user to access his checking account online). In some embodiments, the confirmation code may be used by another third party or device (e.g., the user's smartphone) to access one or more secure networks or files (e.g., to log into a user account).

In contrast, if any other individual were to capture a facial scan and a voice scan, the biometric template would have a different set of stable bits after receiving randomized projections, resulting in a different public key after the stable bits are passed through the hash function.

The method 300 also comprises tagging the first public cryptographic key (step 328). In some embodiments, the first public cryptographic key may be configured to receive a tag (e.g., a digital marker). The tag may determine whether or not the first public cryptographic key is usable. In the event that a user's public key becomes compromised (e.g., the data become corrupted, a hacker or exploiter is able to access or use the key, etc.), the user may be able to tag the public key as unusable. For instance, the user may be verified as the user who generated the public key and may be able to tag the public key such that any time the key is used, the system may reject the key as unusable. In some embodiments, the public key may be automatically tagged by the system when the public key is accessed or used by someone other than the user.

In some embodiments, after tagging the public key as unusable, the user may generate a new public key (e.g., by using a different seed, by using a different set of random projections, by using a different threshold, etc.) to take the place of the compromised public key. By permitting the user to tag the public key as unusable and generate a new key, the user is able to keep his biometric information secure, while still using biometrics to access systems and/or verify his identity.

The present disclosure encompasses embodiments of the method 300 that comprise more or fewer steps than those described above, and/or one or more steps that are different than the steps described above.

Any of the steps, functions, and operations discussed herein can be performed continuously and automatically.

The exemplary systems and methods of this disclosure have been described in relation to revocable or cancellable biometrics. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, point to point network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Exemplary aspects include:

A method according to at least one embodiment of the present disclosure comprises extracting, using a user device, a biometric template, the biometric template comprising biometric information associated with a user; applying a plurality of randomized projections to the biometric template, the plurality of randomized projections generated using a random seed; identifying, based on the application of the plurality of randomized projections, a set of stable bits; combining the set of stable bits with the random seed; generating, based on the combination of the stable bits with the random seed, a public key and a private key; discarding the biometric template and the private key; and publishing the public key, the random seed, and the set of stable bits.

Any of the aspects herein, wherein the combining the stable bits with the random seed comprises passing the stable bits and the random seed through a hash function.

Any of the aspects herein, wherein the hash function is at least one of an identity hash function, a cryptographic hash function, a keyed cryptographic hash function, and a non-cryptographic hash function.

Any of the aspects herein, wherein the biometric template is a combination of biometric fingerprint data, data associated with a voice scan, and data associated with an iris scan.

Any of the aspects herein, wherein application of the plurality of randomized projections comprises matrix multiplication, wherein the set of stable bits comprises a first value threshold, and wherein the plurality of randomized projections are applied to the biometric template in a random order until a number of stable bits in the set of stable bits exceeds the first value threshold.

A system according to at least one embodiment of the present disclosure comprises a processor coupled with an interface; a memory comprising instructions that, when executed by the processor, cause the processor to: extract a biometric template; apply a plurality of randomized projections to the biometric template, the plurality of randomized projections generated using a random seed; identify, based on the plurality of randomized projections, a set of stable bits; combine the set of stable bits with the random seed; generate, based on the combination of the set of stable bits with the random seed, a public key and a private key; discard the biometric template and the private key; and publish the public key, the random seed, and the set of stable bits.

Any of the aspects herein, wherein the biometric template comprises biometric information associated with one or more of a face, a fingerprint, and a voice scan.

Any of the aspects herein, wherein the plurality of randomized projections are stored in a database.

Any of the aspects herein, wherein each of the plurality of randomized projections project data in the biometric template from a first dimension to a second dimension.

Any of the aspects herein, wherein the first dimension is significantly larger than the second dimension.

Any of the aspects herein, wherein data in the biometric template are normalized between a minimum value and a maximum value.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A method, comprising:
    capturing and storing, with a user device, biometric information associated with a user;
    extracting, using the user device, a biometric template associated with the user, wherein the biometric template comprises at least two types of the biometric information;
    applying a plurality of randomized projections to the biometric template to create a set of projected data, the plurality of randomized projections generated using a random seed, wherein the random seed is generated using an algorithm or is input by the user;
    identifying, based on the set of projected data, a set of stable bits, wherein the stable bits are based on a comparison between the biometric template and another biometric template;
    combining the set of stable bits with the random seed to create a combination of the set of stable bits with the random seed;
    generating, based on the combination of the set of stable bits with the random seed, a first public cryptographic key and a first private cryptographic key;
    discarding the biometric template and the first private cryptographic key; and
    publishing the first public cryptographic key, the random seed, and the set of stable bits; and
    providing the user access to a secured system using at least the first public cryptographic key.

2. The method of claim 1, wherein the combining the set of stable bits with the random seed comprises passing the set of stable bits and the random seed through a hash function.

3. The method of claim 2, wherein the hash function is at least one of an identity hash function, a cryptographic hash function, a keyed cryptographic hash function, and a non-cryptographic hash function.

4. The method of claim 1, wherein data in the biometric template is organized in a first matrix, wherein the plurality of randomized projections are organized as a set of projection matrices, and wherein the applying of the plurality of randomized projections to the biometric template comprises:
applying each projection matrix of the set of projection matrices to the first matrix.

5. The method of claim 4, wherein the set of stable bits includes a first threshold value, and wherein each projection matrix is applied to the first matrix in a random order until a number of stable bits in the set of stable bits exceeds the first threshold value.

6. The method of claim 5, wherein the data in the biometric template is normalized between a minimum value and a maximum value.

7. The method of claim 6, wherein each stable bit in the set of stable bits is a bit that does not change mathematical sign when a projection matrix of the set of projection matrices is applied to the first matrix.

8. The method of claim 1, wherein the method further comprises:
generating, using the first public cryptographic key, the random seed, and the set of stable bits, a second public cryptographic key;
comparing the second public cryptographic key to the first public cryptographic key; and
generating, when the second public cryptographic key matches the first public cryptographic key, a confirmation code.

9. The method of claim 1, wherein the biometric template includes a combination of biometric fingerprint data, data associated with a voice scan, and data associated with an iris scan.

10. A system comprising:
a processor coupled with an interface;
a memory comprising instructions that, when executed by the processor, cause the processor to:
capture and store, biometric information associated with a user;
extract a biometric template, wherein the biometric template comprises at least two types of the biometric information;
apply a plurality of randomized projections to the biometric template to create a set of projected data, the plurality of randomized projections generated using a random seed, wherein the random seed is generated using an algorithm or is input by the user;
identify, based on the set of projected data, a set of stable bits, wherein the stable bits are based on a comparison between the biometric template and another biometric template;
combine the set of stable bits with the random seed to create a combination of the set of stable bits with the random seed;
generate, based on the combination of the set of stable bits with the random seed, a first public cryptographic key and a first private cryptographic key;
discard the biometric template and the first private cryptographic key; and
publish the first public cryptographic key, the random seed, and the set of stable bits; and
provide the user access to a secure system using at least the first public cryptographic key.

11. The system of claim 10, wherein the biometric template comprises biometric information associated with one or more of a face, a fingerprint, and a voice scan.

12. The system of claim 10, wherein the plurality of randomized projections are stored in a database.

13. The system of claim 10, wherein each of the plurality of randomized projections project data in the biometric template from a first dimension to a second dimension.

14. The system of claim 13, wherein the first dimension is larger than the second dimension.

15. The system of claim 10, wherein data in the biometric template is organized in a first matrix, wherein the plurality of randomized projections are organized as a set of projection matrices, and wherein the applying of the plurality of randomized projections to the biometric template comprises:
applying each projection matrix of the set of projection matrices to the first matrix.

16. The system of claim 15, wherein the data in the biometric template is normalized between a minimum value and a maximum value.

17. The system of claim 16, wherein each stable bit in the set of stable bits is a bit that does not change mathematical sign when a projection matrix of the set of projection matrices is applied to the first matrix.

18. The system of claim 10, wherein the first public cryptographic key, random seed, and set of stable bits are used to generate a second public cryptographic key.

19. The system of claim 18, wherein the instructions further cause the processor to:
compare the second public cryptographic key to the first public cryptographic key; and
generate, when the second public cryptographic key matches the first public cryptographic key, a confirmation code.

20. A non-transitory computer-readable medium comprising a set of instructions stored therein which, when executed by a processor, cause the processor to:
capture and store, with a mobile device of a user, biometric information associated with the user;
extract a biometric template using the mobile device, the biometric template associated with the user, wherein the biometric template comprises at least two types of the biometric information;
apply a plurality of randomized projections to the biometric template, the plurality of randomized projections generated using a random seed, wherein the random seed is generated using an algorithm or is input by the user;
identify, based on the plurality of randomized projections, a set of stable bits, wherein the stable bits are based on a comparison between the biometric template and another biometric template;
combine the set of stable bits with the random seed to create a combination of the set of stable bits with the random seed;
generate, based on the combination of the set of stable bits with the random seed, a first public cryptographic key and a first private cryptographic key;
discard the first private cryptographic key and the biometric template;
publish the first public cryptographic key, the random seed, and the set of stable bits to a secured system;
generate, using the first public cryptographic key, the random seed, and the set of stable bits, a second public cryptographic key;
compare the second public cryptographic key to the first public cryptographic key; and
generate, when the second public cryptographic key matches the first public cryptographic key, a confirmation information, the confirmation information allowing the user to access the secured system.

* * * * *